June 25, 1963 H. RIES 3,095,481

DIALING ARRANGEMENT FOR TELEPHONE APPARATUS

Filed June 10, 1958 2 Sheets-Sheet 1

INVENTOR.
Hermann Ries

BY
Michael S. Striker
Attorney

June 25, 1963 H. RIES 3,095,481

DIALING ARRANGEMENT FOR TELEPHONE APPARATUS

Filed June 10, 1958 2 Sheets-Sheet 2

INVENTOR.
Hermann Ries

BY Michael S. Striker
Attorney

United States Patent Office 3,095,481

Patented June 25, 1963

3,095,481

DIALING ARRANGEMENT FOR TELEPHONE APPARATUS

Hermann Ries, 180 Sebaldsbruecker Heerstrasse, Bremen, Germany

Filed June 10, 1958, Ser. No. 741,184
6 Claims. (Cl. 179—90)

The present invention relates to a dialing arrangement for telephone apparatus, and more particularly to a dialing arrangement in which the desired telephone number is first fully set and indicated, whereupon the device is actuated to automatically produce all impulses required for obtaining the desired connection in impulse controlled telephone apparatus.

Semi-automatic dialing devices are known in which the selected telephone number is indicated. However, the devices according to the known art are complicated, and it is one object of the present invention to improve the dialing apparatus of the prior art, and to provide a reliably operating dialing arrangement of simple and inexpensive construction.

Another object of the present invention is to provide a dialing apparatus in which a desired telephone number is first set by a manual operation, whereupon a single feeler means successively senses the digits selected in all orders of the telephone number.

Another object of the present invention is the provision of a dialing arrangement in which a single impulse creating contact means is successively opened and closed to provide the necessary impulses so that no slide contacts or brushes are required.

With these objects in view, the present invention mainly consists in a dialing arrangement for impulse controlled telephone apparatus which comprises selector means including a set of control means respectively associated with different digits, each control means having actuating means whose number corresponds to the respective associated digit; feeler means including electrical contact means having an impulse creating condition and an inoperative condition; and circuit means for electrically connecting the contact means with the impulse controlled telephone apparatus.

The selector means are moved between a plurality of positions in which selected control means associated with diferent digits are located along a path, whereupon the feeler means is moved along the predetermined path to successively cooperate with the actuating means of the selected control means. Each actuating means places the contact means in impulse creating condition when cooperating with the feeler means so that impulses are created whose number corresponds to the number of actuating means sensed, and consequently to the respective digit of the telephone number. The telephone apparatus responses to such impulses to produce the desired connection.

According to one embodiment of the present invention the selector means include the plurality of co-axial selector wheels which are respectively associated with the orders of a telephone number and can be independently turned to indicate the selected telephone number. The selected telephone number is indicated in a single line, and the associated control means and actuating means are also located along a straight path so that the feeler means moves along a straight path to sense the number of actuating means of the selected control means.

According to one construction of the present invention the feeler means includes a feeler pin which senses actuating projections. According to another construction, the feeler means is constituted by two contacts which are connected by the conductive surfaces of the selector wheels, but are interrupted when located opposite actuating grooves in the conductive surfaces.

In accordance with another embodiment of the present invention, the selector means is a band on which telephone numbers are indicated in transverse lines. Each telephone number is associated with actuating means, for example openings in the band whose number corresponds to the respective digit. When a feeler pin passes over the openings, the impulse creating contact is opened and the required impulses are sent to the telephone apparatus.

In all embodiments of the present invention, the feeler means is mounted on a bar which is movable between two end positions so that during movement of the bar in one direction all selected actuating means are sensed by the feeler means. A control switch is provided in the circuit of the telephone apparatus, to disconnect the telephone apparatus while the bar and the feeler means perform a return movement after having produced the required selecting impulses during movement of the feeler means in one direction.

The apparatus of the present invention requires only a single connection with the telephone apparatus. Moreover, it is possible to set a desired telephone number on the apparatus before a connection with the telephone exchange is established by taking the receiver off the hook. Only after the indicating means clearly show that the correct telephone number has been set, the receiver is taken off whereupon the above described bar and the feeler means are operated to produce the impulses required for establishing the connection with the desired telephone number. This operation is faster than the conventional dialing operation, since it is not necessary to wait until the dial has returned to initial position after each digit has been selected. In the event that the desired number is busy, the apparatus can be left in set condition, and the bar and feeler means can be again operated on for establishing the desired connection.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
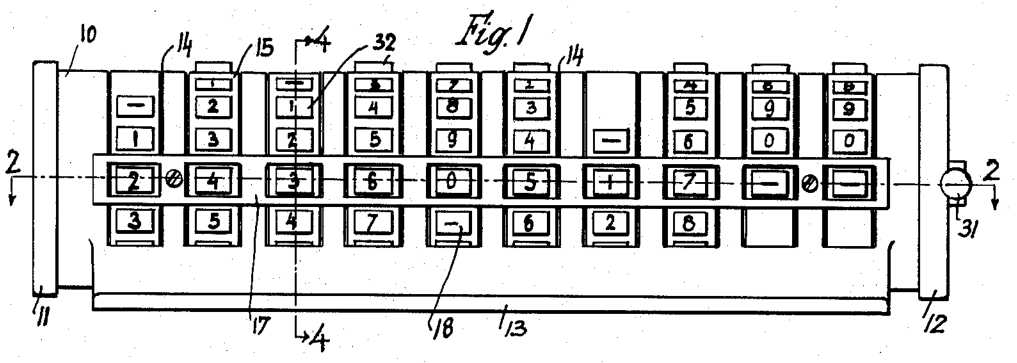
FIGURE 1 is a front view of one embodiment of the present invention.
Figures 2, 3, 4:
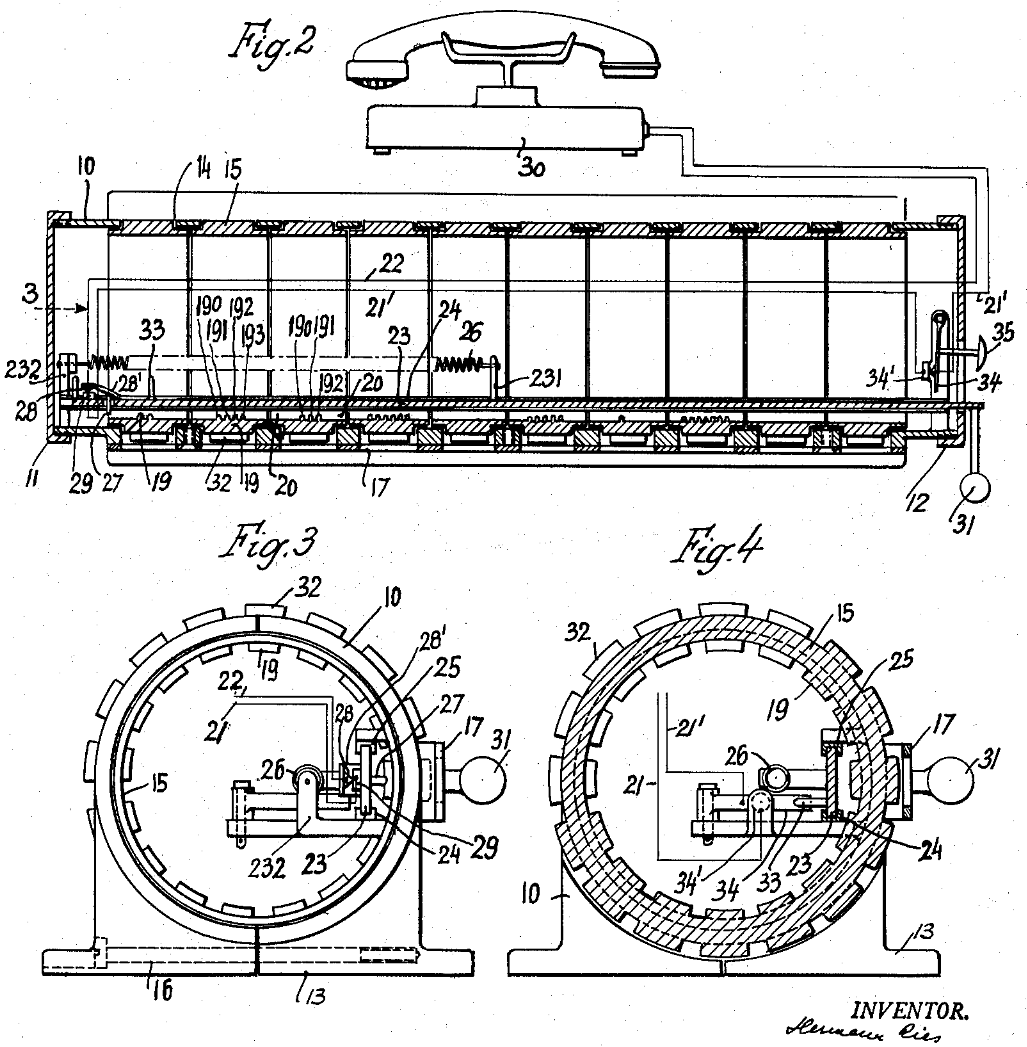
FIGURE 2 is a sectional view taken on line 2—2 in FIGURE 1 and including a diagram of the electric circuit with a telephone apparatus.
FIGURE 3 is an end view of the apparatus as viewed in direction of the arrow 3 in FIGURE 2.
FIGURE 4 is a cross sectional view taken on line 4—4 in FIGURE 1.

Referring now to the drawings, and more particularly to the embodiment shown in FIGURES 1 to 4, a tubular housing 10 is closed by end covers 11 and 12, and has a supporting base 13. The housing 10 is provided with annular slots 14 in which coaxial selector rings 15 are turnably mounted. The housing 10 consists of two parts, as best seen in FIGURE 3, so that the assembly of the device is facilitated. Bolts 16 hold the two parts together.

Each selector ring 15 is associated with one order of a multi-order telephone number, and has on the outer periphery thereof indicia indicating the digits from zero to nine. A window means 17 is mounted on the housing to indicate a set telephone number selected by turning the selector rings until the desired digit appears in the window means. FIGURE 1 shows a position of the selector means in which the number 24360517 is selected and set in the apparatus. Each selector ring preferably has empty spaces 18 having no indicia thereon.

Each selector ring has a set of control means on the inner surface thereof which are spaced in circumferential direction the same distance as the indicia, and are respectively associated with the digits. In the embodiment of FIGURES 1 to 4, the control means are actuating projections 19 spaced along the inner circular surface of each selector ring. The control means associated with the digit 1 has one actuating projection, the control means associated with the digit 2 has two actuating projections, etc. For example, the control means of the second selector ring from the left in FIGURE 2, has four actuating projections 190, 191, 192, and 193.

Each group of actuating projections 19 constitutes a control means, and the control means of adjacent selector rings are spaced a distance 20 which is greater than the small distance between associated actuating projections 190, 191.

A guide means including two rails 24 and 25 is supported in the housing 10, and slidably supports a bar 23. A handle 31 is secured to bar 23 so that a person operating the device can pull bar 23 to the right in FIGURE 2 against the action of a spring 26 which is secured to a bracket 231 on bar 23 and to another bracket 232 on the housing 10. A contact 28 is secured by a contact spring 28' to one end of bar 23 which consists of an insulating material. A cooperating contact 29 is fixed to bar 23, and contact spring 28' normally holds contact 28 in engagement with contact 29.

A feeler pin 27 is movably mounted in a bore of bar 23, and engages contact spring 28'. Contacts 28 and 29 are connected by conductors 21 and 22 to the telephone apparatus 30 which is provided with conventional means for obtaining a connection in accordance with a telephone number when corresponding impulses are received.

The selected control means, namely the actuating projections 190 of a selected telephone number, are all located along a straight path parallel to bar 23, and the feeler pin 27 is arranged to successively engage the actuating projections 19 when the bar 23 is moved along the guide means 24 and 25. Each time the feeler pin 27 engages an actuating projection 19, it is pushed back and bends contact spring 28' so that contacts 28 and 29 are separated. Consequently when feeler pin 27 passes over two projections 190, 191, the circuit 21, 22, 30 is twice interrupted which corresponds to two controlling impulses for the telephoning apparatus. Such two impulses correspond to the digit 2 in the highest order of the desired telephone number. As the feeler pin 27 passes over all aligned selected control means located opposite the guide means 24, 25 and bar 23, impulses are created whose number corresponds to the digits in all orders of the desired telephone number.

Consequently, the telephone apparatus receives impulses which correspond to the impulses produced by turning a dial in standard telephone apparatus.

A control switch including a fixed contact 34', and movable contact 34 is provided in the circuit 21, 22 and is closed during movement of the feeler means 27, 28, 29, 23 to the right as viewed in FIGURE 2, so that the impulses are transferred to the telephone apparatus 30 as described above. After all control means 19 have been sensed by the feeler means 27, 28, 29, and shortly before bar 23 arrives in its end position, a projecting member 33 fixed to bar 23 engages the movable contact arm 34 and opens control switch 34, 34'. The contact arm 34 is so mounted that it tends to remain in any position in which it is placed. Consequently, control switch 34, 34' remains open while the bar 23 performs its return movement under the action of spring 26 after handle 31 is released. This is necessary since the feeler pin 27 will again pass over the actuating projections 19 during the return movement, but due to the fact that the circuit to the telehone apparatus is interrupted by control switch 34, 34', no impulses can be given to the telephone apparatus.

Before the device is again operated for selecting a telephone number, the push button 35 is pressed to move contact arm 34 into a position in which control switch 34, 34' is closed.

Each selector ring 15 has a set of finger engaging portions 32 so that the selector rings 15 can be easily turned into the desired position in which a selected telephone number appears in the window means 17. Thereupon the receiver is removed from the cradle, and the preset telephone number is sensed by pulling the handle 31 to the right as viewed in FIGURE 2. Upon release of the handle, bar 23 returns to its normal position, and when push button 35 is then depressed, the apparatus is ready for the next operation.

Figure 5:
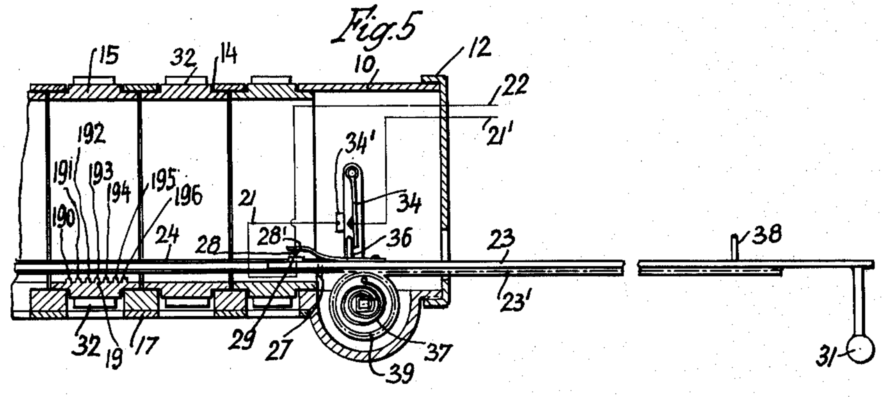
FIGURE 5 is a fragmentary sectional view illustrating a modification of the embodiment shown in FIGURE 2.

The construction illustrated in FIGURE 5 is identical with the construction of FIGURES 1 to 4 as regards the feeler means 27, 28, 29, and the control means 19, one of which is shown in FIGURE 5 to comprise seven actuating projections 19, namely 190 to 196 corresponding to a selected digit 7 in the respective order of the telephone number.

The bar 23 has attached thereto a rack bar 23' which meshes with a gear 39 to which one end of a spiral spring 37 is secured. The inner end of spring 37 is secured to the housing, and the arrangement is such that the spring is tensioned when bar 23 is moved to the left as viewed in FIGURE 5.

Bar 23, and the feeler means 27, 28, 29 are normally in the position illustrated in FIGURE 5 in which the projecting member 36 on bar 23 engages the contact arm 34 of the control switch 34, 34' and holds the control switch in open position interrupting the circuit of the telephone apparatus. Conductor 21 connects contact 29 with contact 34' and conductor 21' connects contact arm 34 with the telephone apparatus. Contact arm 34 tends to remain in any position in which it is placed.

When bar 23 is moved to the left as viewed in FIG. 5 against the action of spring 37, the feeler pin 27 passes over all aligned control means 19 of the selected telephone number, but since control switch 34, 34' interrupts the circuit, no impulses are supplied to the telephone apparatus. Shortly before bar 23 reaches its end position after travelling to the left, projecting member 38 on bar 23 engages contact arm 34 and moves it to a position closing the circuit by engaging contact 34'. When handle 31 is now released, spring 37 moves bar 23 to the right as viewed in FIGURE 5 so that the feeler pin 27 engages all selected control means, and opens contact means 28, 29 to send impulses through the closed control switch 34, 34' to the telephone apparatus until projecting member 36 again opens control switch 34, 34'.

Figure 6:
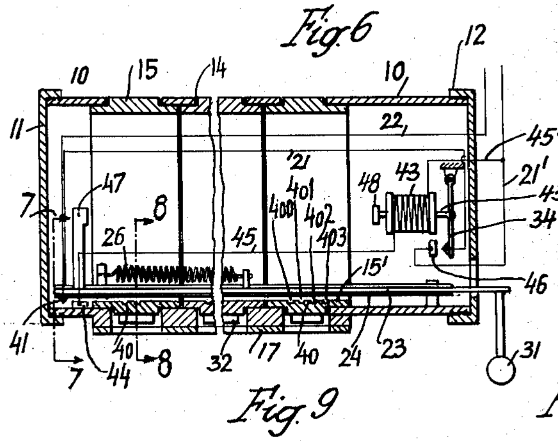
FIGURE 6 is a sectional view illustrating another embodiment of the present invention including a schematic diagram of the electric circuit connecting the device with the telephone apparatus.
Figures 7, 8:
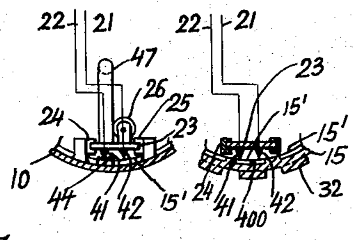
FIGURE 7 is a fragmentary sectional view taken on line 7—7 in FIGURE 6.
FIGURE 8 is a fragmentary sectional view taken on line 8—8 in FIGURE 6 and illustrating another operational position.

The embodiment illustrated in FIGURES 6 to 8 also has a housing 10 in which a plurality of selector rings 15 is turnably mounted. A bar 23 is provided with a handle 31 and mounted in guide means 24, 25 as described with reference to FIGURES 1 to 4. A spring 26 urges bar 23 into the end position illustrated in FIGURE 6.

The feeler means in the embodiment of FIGURE 6 is constituted by contact means comprising two contacts 41, 42 which are spaced in circumferential direction of the selector rings 15. Contact means 41, 42 is mounted on bar 23 and moves with the same. A set of control means 40 are provided on each selector means spaced from each other in circumferential direction. Each control means is constituted by a plurality of axially spaced actuating grooves 400 to 403, for example, whose number corresponds to the number of the respective represented digit. The inner surface of each selector ring 15 is conductive, and the contact means 41, 42 slides along the conductive surfaces of the selector rings 15 when bar 23 is moved in axial direction. Consequently, the circuit of contact means 41, 42 is closed when the same engages a conductive inner surface of a selector ring, and is interrupted when contact means 41, 42 is located opposite a groove of the respective selected control means 40. Contact means 41, 42 are located in the circuit 21, 22, 21′ which connects contact means 41, 42 with the impulse responsive means of a telephone apparatus, not shown.

A control switch including a fixed contact 46, and a movable contact arm 34 is provided in the circuit between conductors 21 and 21′. Control switch 46, 34 is operated by a relay including a solenoid 43 and a movable armature 48 which is connected by a rod 43′ to the movable contact arm 34 of the control switch. A conductor 45 connects the solenoid to a contact 44 fixed on the housing 10, and another conductor 45′ connects the other end of the solenoid to the conductor 21′. An actuating member 47 transversely projects from bar 23, and engages the armature 48 when bar 23 is moved to the right as viewed in FIGURE 6. Thereby, contact arm 34 is moved away from the fixed contact 46. The fixed contact 44 cooperates with the contact 41 during movement of the bar 23.

The device operates as follows:

When bar 23 is moved to the right as viewed in FIGURE 6, contact 41 engages contact 44 and closes the circuit through conductor 22, contact 44, conductor 45, solenoid 43 and conductor 45′. Solenoid 43 is energized, and attracts its armature so that contact arm 34 is moved to a position establishing contact with the fixed contact 46 so that the circuit is closed through the control switch 46, 34. The circuit remains closed during travel of the feeler contact means 41, 42 to the right, but it is interrupted every time contact means 41, 42 passes over a groove 400, 401, etc., in the conductive inner surface of the selected rings 15.

When bar 23 approaches its end position on the right, as viewed in FIGURE 6, actuator member 47 engages armature 48, and separates contacts 34, 46 of the control switch so that the circuit is interrupted. When bar 23 returns to the left under the action of spring 26, no impulses are created, since contact means 41, 42 are disconnected from the telephone apparatus. FIGURE 8 illustrates a position of contact means 41, 42 in which it is located over a groove 400 so that the conductors 21 and 22 are not connected to each other resulting in an interruption of the circuit corresponding to an impulse supplied to the telephone apparatus.

In the above described embodiments of the invention, the selector means are constituted by a plurality of turnable selector rings 15, each of which can be turned independently of the other selector rings so that any desired telephone number can be set on the device.

Figure 9:
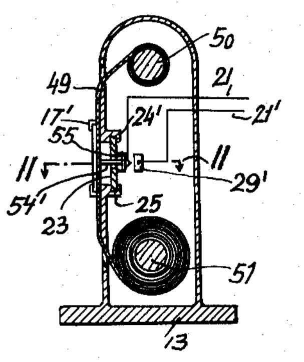
FIGURE 9 is a cross sectional view of another embodiment of the present invention.
Figures 10, 11:
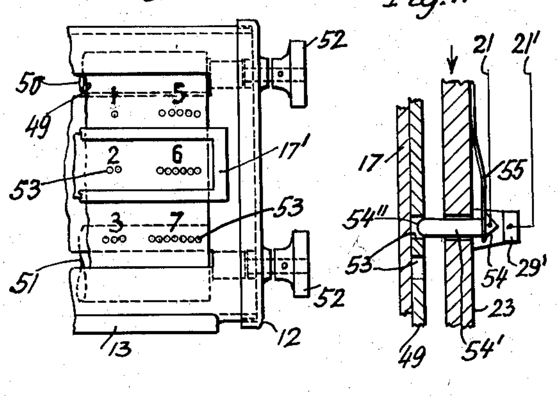
FIGURE 10 is a fragmentary front view of the embodiment shown in FIGURE 9.
FIGURE 11 is a fragmentary sectional view taken on line 11—11 in FIGURE 9 and showing a detail on an enlarged scale.

The embodiment of FIGURES 9 to 11 has selector means in the form of a band 49 which is wound on two rolls 50 and 51 which can be operated by knobs 52 projecting from the end wall 12 of the housing. Groups of indicia representing digits are provided along transverse lines on the band 49, as best seen in FIGURE 10. Each transverse line of the digits represents a desirable telephone number which is frequently used, and consequently when such number is to be selected, the knobs 52 are turned until the selected telephone number appears in the window means 17′. Sets of control means 53 are again associated with each order of the telephone numbers and spaced from each other in longitudinal direciton of the band which corresponds to the direction of movement of the band. In the embodiment of FIGURES 9 to 11, the control means 53 are a plurality of openings in band 49, the number of openings associated with each digit corresponding to the respective digits. The control means 53 of each telephone number are aligned in transverse direction of the band, so that when a selected telephone number is placed behind the window means 17′, the respective control means are aligned along the bar 23 which is slidable in transverse direction on rails 24 and 25.

As best seen in FIGURE 11, and similar to the arrrangement of FIGURES 1 to 4, a feeler pin 54′ is secured to a resilient contact arm 55 which has a contact 54 and is mounted on bar 23. Contact 54 cooperates with a contact 29′ fixed on bar 23 so that whenever feeler pin 54′ passes with its end portion 54″ into an actuating opening 53, contact 54 moves away from contact 29′, whereas contacts 54, 29′ engages each other when feeler pin 54′ slides on the back of the band 49 intermediate openings 53.

Control switch means, not shown in FIGURES 9 to 11, are provided in this embodiment, and are operated either by two projections 36, 38, as described with reference to FIGURE 5, or by a relay system as described with reference to FIGURE 6. In any event, the circuit of the conductor 21, 21′ which are connected to the telephone apparatus, is opened by a control switch during travel of the feeler means 54′, 54, 29′ and of bar 23 in one direction.

From the above description of preferred embodiments of the present invention it will become apparent that the selector means include sets of control means 19, 40, 53, each of which includes a number of actuating means arranged in the direction of movement of the feeler means. The actuating means are either actuating projections as described with reference to FIGURES 2 to 5, or depressed portions in a conductive surface, such as grooves as described with reference to FIGURE 6, or openings 53 as described with reference to FIGURES 10 and 11. The feeler means comprise an impulse creating contact means which is either directly controlled by the actuating means, or is indirectly controlled through a feeler pin attached to a movable contact.

Control means 19, 40, or 53 which are aligned in direction of the feeler movement, and belonging to different orders of the telephone number are spaced from each other a greater distance than the actuating means of each control means are spaced from each other. For example, the openings 53 under the digit 2 in FIGURE 10 are spaced from each other a short distance, and are spaced a much greater distance from the adjacent opening 53 associated with the digit 6. Thereby, a desired rhythm of the impulses is obtained.

It is also contemplated to transfer the impulses by means which effect a variation of the frequency of the electric current which has an effect on the means for interrupting the circuit.

The described embodiments of the present invention are devices which may be added to existing telephone apparatus. However, it will be understood that the housing of the devices can be combined with the housing of a telephone apparatus so that the devices would form part of a telephone apparatus.

It will be understood that each of the elements described above, or two or more together, may also find a useful application in other types of devices for selecting desired telephone numbers differing from the types described above.

While the invention has been illustrated and described as embodied in a dialing arrangement for impulse controlled telephone apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A dialing arrangement for impulse controlled telephone apparatus, comprising, in combination, a housing; a plurality of annular selector means respectively associated with the orders of a telephone number and being mounted on said housing for independent turning movement about a common axis, each selector means including a set of control means spaced along a circle on the inner surface of the respective selector means, each control means having a number of axially spaced actuating means corresponding to a digit, each selector means being turnable about said axis independently of the other selector means between a plurality of positions in which selected control means are aligned in axial direction so that said actuating means are located on a straight axially extending path; feeler means movable parallel to said axis and along said path between a first position at least partly located within said selector means and a second position located at least partly outside of said selector means, said feeler means including impulse creating means having an impulse creating condition and an inoperative condition, said feeler means cooperating successively with said actuating means of said selected control means during movement along said path, each actuating means placing said impulse creating means in said impulse creating condition when cooperating with said feeler means; and circuit means for electrically connecting said impulse creating means with said impulse controlled telephone apparatus.

2. A dialing arrangement for impulse controlled telephone apparatus, comprising, in combination, a housing; a plurality of annular selector means respectively associated with the orders of a telephone number and being mounted on said housing for independent turning movement about a common axis, each selector means including a set of control means spaced along a circle on the inner surface of the respective selector means, each control means having a number of axially spaced actuating means corresponding to a digit, each selector means being turnable about said axis independently of the other selector means between a plurality of positions in which selected control means are aligned in axial direction so that said actuating means are located on a straight axially extending path; feeler means movable in opposite directions parallel to said axis and along said path between a first position at least partly located within said selector means and a second position located at least partly outside of said selector means, said feeler means including electric contact means having an impulse creating condition and an inoperative condition, said feeler means cooperating successively with said actuating means of said selected control means during movement along said path, each actuating means placing said electrical contact means in said impulse creating condition when cooperating with said feeler means; circuit means for electrically connecting said contact means with said impulse controlled telephone apparatus, and including control switch means and actuating means for actuating said control switch means to assume a circuit breaking position during movement of said feeler means in one of said directions of movement, and a circuit closing position during movement of said feeler means in the opposite direction of movement.

3. A dialing arrangement as set forth in claim 2 wherein said actuating means is mounted for movement with said feeler means, and wherein said control switch tends to remain in each of said positions, and being actuated by said actuating means after said feeler means moves in one direction to an end position to assume said circuit breaking position and remaining in said circuit breaking position during return movement of said feeler means.

4. A dialing arrangement for impulse controlled telephone apparatus, comprising, in combination, a housing; a plurality of annular selector rings respectively associated with the orders of a telephone number and being mounted on the outer surfaces thereof in said housing for independent turning movement about a common axis, each selector ring including a set of control means spaced along a circle on the inner surface of the respective selector ring, each control means having a number of axially spaced actuating means corresponding to a digit, each selector ring being turnable about said axis independently of the other selector rings between a plurality of positions in which selected control means are aligned in axial direction so that said actuating means are located on a straight axially extending path; feeler means movable parallel to said axis and along said path between a first position at least partly located within said selector rings and a second position located at least partly outside of said selector rings, said feeler means including electric contact means having an impulse creating condition and an inoperative condition, said feeler means cooperating successively with said actuating means of said selected control means during movement along said path, each actuating means placing said electrical contact means in said impulse creating condition when cooperating with said feeler means; and circuit means for electrically connecting said contact means with said impulse controlled telephone apparatus.

5. A dialing arrangement as set forth in claim 4 wherein said housing has a row of window means aligned parallel to said axis; and wherein each of said selector rings has a number of indicia circumferentially spaced along the outer surface thereof and respectively associated with the control means of the respective selector ring, the indicia means of control means located on said path being axially aligned and located behind said window means.

6. A dialing arrangement as set forth in claim 4 and including elongated guide means located along said path within said selector rings; and wherein said feeler means includes a bar mounted on said guide means for axial movement, and a feeler mounted at one end of said bar and cooperating with said actuating means to move said contact means between said impulse creating and inoperative conditions.

References Cited in the file of this patent

UNITED STATES PATENTS

| | | |
|---|---|---|
| 1,891,633 | Batdorf | Dec. 20, 1932 |
| 1,913,905 | Servanton | June 13, 1933 |
| 2,032,229 | Servanton | Feb. 25, 1936 |
| 2,191,913 | Lewis | Feb. 27, 1940 |